(12) United States Patent
Noshari

(10) Patent No.: US 12,208,919 B2
(45) Date of Patent: Jan. 28, 2025

(54) SYSTEM FOR MONITORING A PAYLOAD, AIRCRAFT AND METHOD

(71) Applicant: AIRCRAFT CABIN MODIFICATION GMBH, Memmingen (DE)

(72) Inventor: Arash Hagh Shenas Noshari, Hamburg (DE)

(73) Assignee: Aircraft Cabin Modification GmbH, Memmingen (DE)

( * ) Notice: Subject to any disclaimer, the term of this patent is extended or adjusted under 35 U.S.C. 154(b) by 312 days.

(21) Appl. No.: 17/754,330

(22) PCT Filed: Oct. 14, 2020

(86) PCT No.: PCT/EP2020/078910
§ 371 (c)(1),
(2) Date: Mar. 30, 2022

(87) PCT Pub. No.: WO2021/074228
PCT Pub. Date: Apr. 22, 2021

(65) Prior Publication Data
US 2022/0340297 A1  Oct. 27, 2022

(30) Foreign Application Priority Data

Oct. 16, 2019 (EP) .................... 19203609

(51) Int. Cl.
*B64D 9/00* (2006.01)
*B64C 1/20* (2006.01)
(Continued)

(52) U.S. Cl.
CPC .............. *B64D 9/00* (2013.01); *B64C 1/20* (2013.01); *G01G 19/12* (2013.01); *G01M 1/125* (2013.01)

(58) Field of Classification Search
CPC . B64D 9/00; B64D 11/06; B64C 1/20; G01G 19/12; G01M 1/125; B64F 5/60; Y02T 50/40
(Continued)

(56) References Cited

U.S. PATENT DOCUMENTS 4,446,524 A   5/1984  Wendt
6,032,090 A * 2/2000  von Bose ............... G01G 19/07
                                                  177/136
(Continued)

FOREIGN PATENT DOCUMENTS

CN   102538917 A   7/2012
CN   104331605 A   2/2015
(Continued)

OTHER PUBLICATIONS

Extended European Search Report regarding corresponding EP Application No. 19203609.3, mailed Apr. 16, 2020.
(Continued)

*Primary Examiner* — Jacques M Saint Surin
(74) *Attorney, Agent, or Firm* — Lewis & Reese, PLLC

(57) ABSTRACT

The invention relates to a payload monitoring system of an aircraft, wherein the system comprises at least one storage area (26, 28, 30, 32, 36, 38, 42) for a payload and at least one pressure sensor (10), wherein the at least one sensor (10) is configured to detect a weight force and its center of gravity of payload resting on the storage area (26, 28, 30, 32, 36, 38, 42). Furthermore, the invention relates to an aircraft and a method for operating an aircraft.

15 Claims, 2 Drawing Sheets

(51) Int. Cl.
  *G01G 19/12*   (2006.01)
  *G01M 1/12*   (2006.01)
(58) Field of Classification Search
  USPC .............................................................. 177/5
  See application file for complete search history.

(56) References Cited

U.S. PATENT DOCUMENTS

| | | | | |
|---|---|---|---|---|
| 6,993,419 | B2* | 1/2006 | D'Ouince | G01L 27/007 |
| | | | | 701/30.6 |
| 7,281,148 | B2* | 10/2007 | Munguia | G06F 1/324 |
| | | | | 710/309 |
| 8,515,656 | B2* | 8/2013 | Reed | G01M 1/125 |
| | | | | 701/3 |
| 9,308,993 | B2* | 4/2016 | Eccles | F41G 3/22 |
| 9,465,045 | B2* | 10/2016 | Dos-Reis | G01L 19/083 |
| 9,878,778 | B2* | 1/2018 | Conners | B64C 23/04 |
| 2006/0038077 | A1 | 2/2006 | Olin et al. | |
| 2006/0169842 | A1 | 8/2006 | Rehn | |
| 2009/0105874 | A1 | 4/2009 | Teitjen et al. | |
| 2017/0073081 | A1 | 3/2017 | Regan et al. | |
| 2017/0283086 | A1 | 10/2017 | Garing et al. | |
| 2017/0315014 | A1 | 11/2017 | Regan et al. | |

FOREIGN PATENT DOCUMENTS

| | | |
|---|---|---|
| JP | 2018104194 A | 7/2018 |
| JP | 2019073267 A | 5/2019 |
| KR | 1020180045841 A1 | 5/2018 |

OTHER PUBLICATIONS

Communication Pursuant to Article 94(3) EPC regarding corresponding EP Application No. 19203609.3, mailed Sep. 15, 2020.
Communication Pursuant to Article 94(3) EPC regarding corresponding EP Application No. 19203609.3, mailed Mar. 25, 2021.
International Search Report and Written Opinion regarding corresponding PCT Application No. PCT/US2020/078910, mailed Dec. 17, 2020.
Notification of the First Office Action regarding corresponding Chinese Patent Application No. 202080071875.4, mailed Aug. 28, 2024.
Decision of Grant regarding corresponding Japanese Patent Application No. 2022-523014, mailed Oct. 22, 2024.

* cited by examiner

SYSTEM FOR MONITORING A PAYLOAD, AIRCRAFT AND METHOD

FIELD OF THE INVENTION

The present invention relates to a payload monitoring system for an aircraft. Furthermore, the invention relates to an aircraft and to a method for operating an aircraft.

INTRODUCTION

The main purpose of aircraft is to transport payload. The payload must be accommodated and distributed in the aircraft. Weight distribution of the payload has a considerable influence on the center of gravity of the aircraft, which can significantly change its flight characteristics. Therefore, at least a large portion of the payload, such as, for example, baggage and cargo, is usually weighed and a loading plan for its arrangement in the aircraft is prepared. In the case of appropriate loading, the influence of the payload on the flight properties can thus be optimized.

However, loading can deviate from the loading plan, for example due to an erroneous distribution of cargo and baggage in the cargo hold of the aircraft by a ground crew. In addition, parts of the payload may not have been detected or weighed during loading. This can lead to deviating influences on the flight properties, entailing that they may be worse than expected. For example, unfavorable loading can result in an increased fuel consumption during the flight. These deviating influences can sometimes be detected only after the takeoff of the aircraft, and thus dangerous flight situations, such as, for example, a so-called "tailstrike", can occur during takeoff. Likewise, payload can also change its position in the aircraft during the flight, for example by slipping. Here, too, an unexpected influence on the flight properties can occur, which can entail deteriorated flight properties or even a hazard.

SUMMARY

It is therefore an object of the present invention to contribute to flight safety and optimization of flight properties.

This object is achieved by the subject-matter of the independent claims. Advantageous embodiments with expedient further modifications of the invention are indicated in the respective subclaims.

A first aspect of the invention relates to a payload monitoring system of an aircraft. The system can comprise at least one storage area for payload and at least one pressure sensor. Preferably, the at least one sensor is configured to detect a weight force and its center of gravity of payload resting on the storage area. Thus, a detection of an actual payload distribution is made possible. Preferably, the system comprises at least one floor area in a cargo hold of the aircraft as a storage area so that the system is adapted to determine the actual payload distribution in the cargo hold. Thus, this payload distribution can be optimized. An influence on the flight properties can thus be known and thus taken into account and/or optimized. An unsafe load distribution can be identified or excluded. Accordingly, respective flight properties and the flight safety can be improved. A pressure sensor is advantageous in this connection because it can directly detect the load in an easy, robust, space-saving and energy-saving manner. Moreover, a pressure sensor is resistant to interference in this type of application.

The aircraft can be, for example, a passenger aircraft, a civil aircraft and/or a cargo aircraft. However, the term aircraft can also be used herein to refer to other aircraft, such as zeppelins, helicopters and gyrocopters.

The storage area can be an area of the aircraft, for example a floor area, and/or for example formed by a floor panel. The storage area can be, for example, any area on which payload can be placed or laid down or can stand or sit. Preferably, the storage area is an area in an interior of the aircraft, in particular in a payload bay, such as a cargo hold, or in a passenger cabin. Respective storage areas can also be defined by lateral boundaries or by the sensor itself. A cargo hold can comprise, for example, several compartments, each forming a storage area, and can be separated, for example, by partitioning walls. However, the cargo hold can also be continuous, for example, and in this case respective sensors define a division into different storage areas.

Preferably, the storage area corresponds to a floor area in a cargo hold of an aircraft, wherein the floor area in the cargo hold preferably comprises a plurality of, more preferably at least three, floor area sectors, and wherein the system comprises a plurality of pressure sensors respectively assigned to the plurality of floor area sectors for respectively detecting the weight force and/or its center of gravity of payloads resting on a plurality of floor area sectors, wherein one or more sensors can be assigned to one floor area sector. Preferably, each of the floor area sectors is adapted to accommodate at least one cargo container.

Preferably, the total storage area which is equipped with pressure sensors such that a weight force and/or its center of gravity of payload resting on this storage area can be detected comprises at least 20 m$^2$, preferably at least 50 m$^2$ and particularly preferably at least 100 m$^2$.

Preferably, the system is adapted to determine the actual payload distribution in the cargo hold during the flight, preferably continuously. Preferably, the system is adapted to detect a weight force and/or its center of gravity of payload resting on the storage area during the flight, preferably continuously. Preferably, the system is adapted to detect a weight force and/or its center of gravity of payload resting on the storage area during loading of the cargo hold, immediately after finished loading of the cargo hold and/or the aircraft, prior to takeoff, upon reaching the cruising altitude and/or prior to landing. Preferably, the system is adapted to determine the actual payload distribution in the cargo hold (40) during loading of the cargo hold, immediately after finished loading of the cargo hold and/or the aircraft, prior to takeoff, upon reaching the cruising altitude and/or prior to landing.

Payload resting on the storage area, in particular on the at least one pressure sensor, can be detected by means of the at least one pressure sensor. The pressure sensor can preferably resolve the load according to location and intensity. The pressure sensor can thus be configured to detect a pressure distribution and/or load distribution on a specific area, in particular the storage area. In particular, the pressure sensor can have a spatial resolution that allows it to detect pressure acting on a 100 mm$^2$ area (e.g., 10 mm×10 mm) and to distinguish it from pressure acting on a corresponding, adjacent area. Preferably, the pressure sensor can have a spatial resolution that allows it to detect pressure acting on a 25 mm$^2$ area (e.g., 5 mm×5 mm) and to distinguish it from pressure acting on a corresponding, adjacent area. The pressure sensor can be located, for example, in or on the storage area of a payload bay of the aircraft. The pressure sensor can be assigned to one or more storage areas.

The detected load and/or load distribution can be output as data by the system and/or displayed by the system, in particular by means of a display device, such as a screen in the cockpit. A transmission and display can also be effected to a computer, tablet, smartphone and/or smartwatch. The detection can be, for example, continuous, quasi-continuous, intermittent, only when the aircraft is parked and/or only in certain flight attitudes and/or in the case of turbulence above or below a threshold value. This can enable monitoring over an entire flight, increase accuracy, and/or save energy in order to carry out a detection only after a possible shift of the load.

In a further advantageous embodiment of the system, it is provided that the system comprises a plurality of pressure sensors for respectively detecting the weight force and its center of gravity of payloads resting on a plurality of storage areas, wherein one or more sensors are assigned to one storage area. For example, one pressure sensor can be provided per storage area, or two pressure sensors or more can be provided per storage area. However, two or more storage areas can also be assigned to one pressure sensor, the load of said two or more storage areas being detected by the one pressure sensor. Preferably, a respective pressure sensor is always assigned to only one storage area. In the context of this text, reference is sometimes made only to one or the storage area and/or to one or the pressure sensor, wherein respective statements then also apply to a plurality of pressure sensors and/or storage areas, if applicable. The pressure sensor can also be simply referred to as the sensor.

The respective payload is preferably assigned to one storage area and can comprise one or more objects. For example, one suitcase can rest on one storage area and said suitcase can be detected. Yet, for example, a plurality of suitcases can rest on one storage area, whose entire weight and common center of gravity are detected together for the storage area.

In a further advantageous embodiment of the system, it is provided that the system comprises an evaluation device which is configured to determine an influence of the detected payload on the overall center of gravity of the aircraft on the basis of respective detected weight forces and centers of gravity. Thus, an influence of the detected payload on respective flight properties can be directly calculated. Accordingly, this allows to optimize trim, to optimize weight distribution and to identify unsafe payload distribution. For this purpose, the evaluation device can have access to further data, such as, for example, a fuel level and a flight attitude. For this purpose, the evaluation device can be connected to corresponding sensors of the aircraft and/or the system can comprise these additional sensors. Furthermore, the center of gravity of the unloaded aircraft can be known and taken into account in the evaluation, for example stored in a database. In particular, the evaluation device can determine the influence as a function of a pressure point and/or neutral point of the aircraft and/or its wing and/or tail. The respective pressure points and neutral points can also be detected and/or determined by means of respective sensors. The evaluation device can also be connected to these corresponding sensors of the aircraft and/or the system can comprise these sensors.

In a further advantageous embodiment of the system, it is provided that, depending on the determined influence of the detected payload on the overall center of gravity of the aircraft, the evaluation device is further configured to determine trim of the aircraft corresponding thereto. This trim can be optimized with respect to one or more flight properties, such as, for example, air drag and/or fuel consumption. Additionally, the trim can thus be favorably adjusted prior to takeoff, for example, to avoid dangerous trim during the takeoff and thus potentially a hazard. Optionally, the system comprises a control device that adjusts the determined trim, in particular by adjusting an angle of attack of the horizontal stabilizer, adjusting respective elevators and/or adjusting respective trimming tabs. Thus, the trim can be automatically optimized with respect to the detected payload distribution. Alternatively or additionally, trim of a lateral and/or yaw control can be determined. Possibly, a redistribution of the payload can also be indicated, for example, to change an uneven payload distribution in the lateral direction. The determined trim can alternatively or additionally also be output, in particular on a display in the cockpit, for example on a screen of a flight plan computer. The determined corresponding trim can also be determined as a deviation from a usual trim value or a trim value determined on the basis of a loading plan of the aircraft, also taking into account the flight plan (altitude, speed, etc.). This information can assist the cockpit crew, in particular the pilot, in flight control and also in detecting problems. Trim can be determined continuously during the flight, for example, to detect and compensate for slippage of payload. In the event of severe slippage, the aircraft can be actively controlled by the control device as an additional measure or as trim in order to maintain a safe flight attitude and/or avoid or escape from an unsafe flight condition.

In a further advantageous embodiment of the system, it is provided that the system comprises an evaluation device which is configured to compare respective detected weight forces and centers of gravity with respective predetermined weight forces and centers of gravity and to output a warning signal when a maximum deviation is exceeded. Preferably, the evaluation device is configured to compare the determined influence of the detected payload on the overall center of gravity of the aircraft with a predetermined influence of the payload on the overall center of gravity of the aircraft and to output the warning signal when a maximum influence deviation is exceeded. Thus, a warning can be issued when the payload distribution in the aircraft is outside admissible limits and/or deviates too much from an expected and/or predetermined distribution, for example due to incorrect loading by the ground crew. A loss of load can also be detected in this way and a respective warning issued and/or appropriate measures initiated. The warning signal can, for example, be output acoustically and/or visually by means of an output device, for example a screen in the cockpit.

In a further advantageous embodiment of the system, it is provided that the evaluation device is configured to determine the respective predetermined weight forces and centers of gravity and/or the predetermined influence on the overall center of gravity of the aircraft as a function of a loading plan of the aircraft. Accordingly, this enables detection of incorrect and/or undesirable loading. It can thus be checked whether the aircraft has been loaded as planned.

In a further advantageous embodiment of the system, it is provided that the respective predetermined weight forces and centers of gravity and/or the predetermined influence on the overall center of gravity of the aircraft corresponds to respective predetermined maximum values. In this way, an aircraft type-specific admissible distribution or uneven distribution and/or also maximum payload in individual sectors or on individual storage areas can be taken into account. In addition, maximum loading of the aircraft itself can also be taken into account in this way. Respective maximum values can be aircraft-specific, for example, in order to avoid a tailstrike. When the corresponding limits are exceeded, a warning can thus be issued.

In a further advantageous embodiment of the system, it is provided that the respective predetermined weight forces and centers of gravity and/or the predetermined influence on the overall center of gravity of the aircraft corresponds to respective values determined beforehand by the evaluation device, in particular at a specific point in time such as immediately after finished loading of the aircraft, prior to takeoff or upon reaching the cruising altitude. The previous values can enable a dynamic consideration, for example, to detect a shift of the load during turbulence and to warn accordingly when the shift is too extensive. The previously determined values can, for example, also be values with a predetermined time interval from a current detection, such as, for example, 5 min, 1 min, 30° s, 10° s, or 1° s before.

The respective predetermined weight forces and centers of gravity can also be assigned multiple times for individual storage areas and/or the aircraft. For example, maximum values for the aircraft type and/or previous values can be taken into account. Preferably, a warning signal is already output when the lowest of these values is exceeded. Thus, all of these respective limit values can be stored and/or determined and then the relevant smallest value can be used in each case. The respective admissible deviations can be predetermined depending on the respective limit values, for example a deviation by a certain percentage, or also as an absolute value.

In a further advantageous embodiment of the system, it is provided that the system comprises as a storage area at least one floor area in a cargo hold of the aircraft, an area where passengers can stay in a passenger cabin of the aircraft, such as an aisle floor, a seat surface and/or a backrest, and/or a floor area in a lavatory, an area in a galley, such as a storage area for a trolley, a shelf in a stowage space of the galley, for example for accommodating an Atlas container, a storage area in an overhead bin above respective rows of seats in the passenger cabin, and/or a floor area in an access to the galley, the passenger cabin and/or the cargo hold. Accordingly, respective payloads can comprise, for example, passengers, cargo, baggage, carry-on baggage, food, consumables and/or items sold in the aircraft, such as alcoholic beverages and perfumes. Preferably, the payload does not include the passengers and can comprise, for example, only inanimate objects.

The system can comprise an additional sensor that detects respective payload passing the access, such as containers, trolleys or freight containers. For example, the passing payload can be identified by means of a barcode reader. In this way, the detected weight force and its center of gravity can be assigned to the respective payload and can also be correctly taken into account when said payload is placed at a different location. For this purpose, a corresponding sensor can also be provided at the target location or the introduced payload can be tracked and its target location detected, for example with another additional sensor of the system, such as a camera. All in all, the number of pressure sensors can thus be lower and, if so, the system can be more cost-efficient and lighter.

The system can also comprise an additional sensor at respective storage areas, which is configured to identify the payload. For example, barcode readers can also be arranged at respective stowage spaces of a galley and/or in the cargo hold in order to identify, for example, cargo containers, Atlas containers and/or trolleys, or even pieces of baggage.

By means of the detection of weight force and centers of gravity, consumption in the aircraft can also be detected, for example of food, sales items and beverages. This makes it possible to implement a storage management where only goods consumed as needed are replenished. For example, in a drawer of a trolley, the pressure sensor can detect which bottles have been emptied and to what extent in the event that individual bottles are assigned to a specific location, and corresponding refill orders can be placed, in particular automatically even before the aircraft lands. In this way, inventory can also be carried out automatically and/or thefts can be discovered.

In the overhead bin, each piece of carry-on baggage can be individually detected by means of a corresponding spatial resolution of the detection by the pressure sensor. In this way, for example, a maximum weight exceedance of individual pieces of baggage in the overhead bin can be detected. In response thereto, an additional charge can be levied and/or such baggage can be placed in the baggage room or cargo hold of the aircraft to increase security.

In a further advantageous embodiment of the system, it is provided that the system comprises an evaluation device which is configured to detect respective actual weight forces and actual centers of gravity on the basis of the respective detected weight forces and their respective detected centers of gravity as a function of an aircraft attitude. The aircraft attitude can influence the detected weight force and its center of gravity. For example, the pressure sensor can only measure pressure loads acting orthogonally on the storage area. However, an inclined aircraft can mean, for example, that the weight force is no longer acting orthogonally on the storage area and thus falsifies the measuring results. By a corresponding consideration of the aircraft attitude, the actual weight forces of the payload and also their respective centers of gravity can be calculated. Accordingly, a better conclusion on the influence of the payload on the aircraft can also be determined. The evaluation device can be configured to determine the respective actual weight forces and their centers of gravity depending on an aircraft attitude and respective detected weight forces and their centers of gravity.

The aircraft attitude can be defined as a spatial orientation of the aircraft and thus also of respective storage areas. The aircraft attitude can be in particular a flight attitude or also a standing condition on the landing gear, for example in a parking position. The aircraft attitude can also include accelerations of the aircraft or the accelerations can additionally be taken into account in the detection of respective actual weight forces and their respective actual centers of gravity. The aircraft attitude can be detected, for example, by a gyroscope and/or by other sensors, such as an angle of attack sensor. The evaluation device can be connected to these sensors or be configured to be connected thereto, wherein the system can furthermore also comprise these sensors.

In a further advantageous embodiment of the system, it is provided that the system comprises at least one pressure sensor arranged in or on a side surface laterally bounding a respective storage area, wherein the at least one laterally arranged sensor is configured to detect the weight force and its center of gravity of payload supported on the side surface. Thus, force components which do not act on the storage area can also be taken into account. In particular, actual weight forces and their centers of gravity can thus be determined even without knowledge of the aircraft attitude. Even in the case of irregularly shaped payload bays, the influence of the payload arranged therein on the aircraft can thus be fully detected. For example, an inclined side wall in the fuselage can hold the pieces of baggage when they are stacked in the manner of a funnel, and their complete weight can thus be precisely determined.

In a further advantageous embodiment of the system, it is provided that at least one of the respective pressure sensors is configured as a surface sensor, in particular as a textile surface sensor. A surface sensor is a cost-efficient and easy way to detect a weight force and its center of gravity on a surface. A textile surface sensor is robust and can easily be used even in the case of irregularly shaped surfaces. Advantageously, a surface sensor can detect a surface load. A textile surface sensor can also simultaneously form a surface of the storage area, for example in the manner of a floor carpet or a seat cover. As a result, the sensor is integrated there in a space-saving manner and/or a separate surface layer can be dispensed with, which means that the system and also the aircraft can be lightweight and cost-efficient. Preferably, the textile surface sensor is configured as a capacitive textile surface sensor, resistive textile surface sensor or textile surface sensor with transmitter detection.

The pressure sensor can also be configured, for example, as a mechanical and/or inductive proximity sensor, a piezo crystal or a compressed air hose. A reed switch or Hall sensor can also be used as a pressure sensor, for example.

The textile pressure sensor can be formed, for example, by two capacitive wires which are spaced apart from each other, e.g., by a 3D textile in or on which they are connected. By means of pressure onto the textile, the distance is reduced, resulting in a detectable change in capacitance. The surface sensor can also be formed by using a conductive yarn as the electrode and a foam as the dielectric. The surface sensor can be formed in a matrix shape to enable a spatial resolution of the detection. The pressure sensor can include an analysis device which evaluates respective sensor signals. It is also possible to mix different sensor types in the case of a plurality of pressure sensors provided in order to be able to use their respective advantages in a targeted manner depending on their position and/or to improve the measurement accuracy.

A capacitive textile surface sensor enables a particularly precise determination of seat load and/or pressure even in the case of high loads. In particular, even in the case of loads of more than 5 kg, their location can be precisely determined. The capacitive textile surface sensor is advantageous, for example, in the case of high loads, such as in the cargo hold or on aircraft seats. Capacitive textile surface sensors can be integrated into aircraft seats particularly easily and in a weight-saving manner. In addition, a capacitive surface sensor has a particularly low power consumption.

A resistive textile surface sensor detects a pressure load based on a change in a transition resistance between two sensor threads. A resistive surface sensor can detect even low forces particularly precisely and with high resolution and is therefore particularly suitable for the overhead bins above the respective rows of seats and detections in the galley.

A textile surface sensor with transmitter detection can operate by feeding an AC signal with a defined frequency in the case of a transmitting textile layer. The AC signal is received by a receiving textile layer, wherein a distance influences, for example, the signal strength. The distance can change under pressure load. Preferably, a spacer layer which deforms under the action of a force is arranged between the receiver layer and the transmitter layer. The spacer layer can be configured, for example, as a spacer knitted fabric, foam or elastomer. A textile surface sensor is particularly suitable for large-area sectors and complicated geometries.

A sensor with compression concept is, for example, a pressure hose with a measuring device for the pressure at one end. Compression and resulting overpressure due to a load can thus be detected. In the case of a textile component, the pressure body can be kept in an initial state by the textile. A spacer knitted fabric, for example, is suitable in this context. The surface of such a sensor can be closed and thus easily wipeable and disinfectable. This makes the sensor well suited for work surfaces in the galley and surfaces that can become soiled, such as a tray on a trolley. Moreover, soft materials can be used for sensitive applications. For example, the sensor can also be used well in the case of an aircraft bed, wherein a spacer knitted fabric can also form the elastic suspension of the bed.

In a further advantageous embodiment of the system, it is provided that the system comprises at least one database device for storing respective detected values and/or respective evaluations, in particular as a time history. This entails that the values are available for a later evaluation and consumption predictions and logistics predictions, for example with regard to goods in the galley and the on-board store. It can also be analyzed which ground crews are working particularly reliably. Furthermore, recourse claims against the airport can be asserted on the basis of data stored in this way, for example in the case of improper loading according to the loading plan and increased fuel consumption caused thereby. Material fatigue of respective storage areas or other aircraft parts can also be predicted or determined by stored data. Respective evaluations can concern, for example, determinations and/or calculations of the evaluation device.

In a further advantageous embodiment of the system, it is provided that the system comprises at least one transmission device for storing respective detected values and/or respective evaluations, in particular by means of radio. As a result, these data can be used on the ground and in devices external to the aircraft. In particular, these data can thus be further processed already prior to landing, for example in order to automatically initiate an order and/or a replenishment of consumables in the galley.

A second aspect of the invention relates to an aircraft comprising a system according to the first aspect of the invention, in particular to a civil passenger aircraft comprising a system according to the first aspect of the invention. The features and advantages resulting from the system according to the first aspect are to be taken from the description of the first aspect, wherein advantageous embodiments of the first aspect are to be regarded as advantageous embodiments of the second aspect and vice versa.

A third aspect of the invention relates to a method for operating an aircraft, in particular comprising a system according to the first aspect and/or for operating an aircraft according to the second aspect. In the method, at least one weight force and its center of gravity of payload arranged on a storage area of a payload bay of the aircraft is detected.

The method is suitable for controlling or operating the system according to the first aspect and/or the aircraft according to the second aspect. The features and advantages resulting from the system according to the first aspect and from the aircraft according to the second aspect are to be taken from the description of the first and second aspects, wherein advantageous embodiments of the first and second aspects are to be regarded as advantageous embodiments of the third aspect and vice versa.

In a further advantageous configuration of the method, the method further optionally comprises at least one of the following steps:
- output of respective detected values;
- display of respective detected weight forces and their centers of gravity;
- output of a warning depending on respective detected weight forces and their centers of gravity;
- adjustment of trim of the aircraft depending on respective detected weight forces and their centers of gravity;
- take-off clearance or take-off prohibition depending on respective detected weight forces and their centers of gravity;
- rearrangement of respective payload in the aircraft depending on respective detected weight forces and their centers of gravity;
- consumables management depending on respective detected weight forces and their centers of gravity;
- storage and/or transmission of respective detected values and/or respective evaluations.

Further advantages, features and details of the invention will be apparent from the following description of a preferred embodiment as well as from the drawings. The above features and combinations of features mentioned in the description, as well as the features and combinations of features mentioned below in the description of the Figures and/or shown alone in the Figures, can be used not only in the respectively indicated combination, but also in other combinations or on their own, without departing from the scope of the invention.

DETAILED DESCRIPTION

Figure 1:
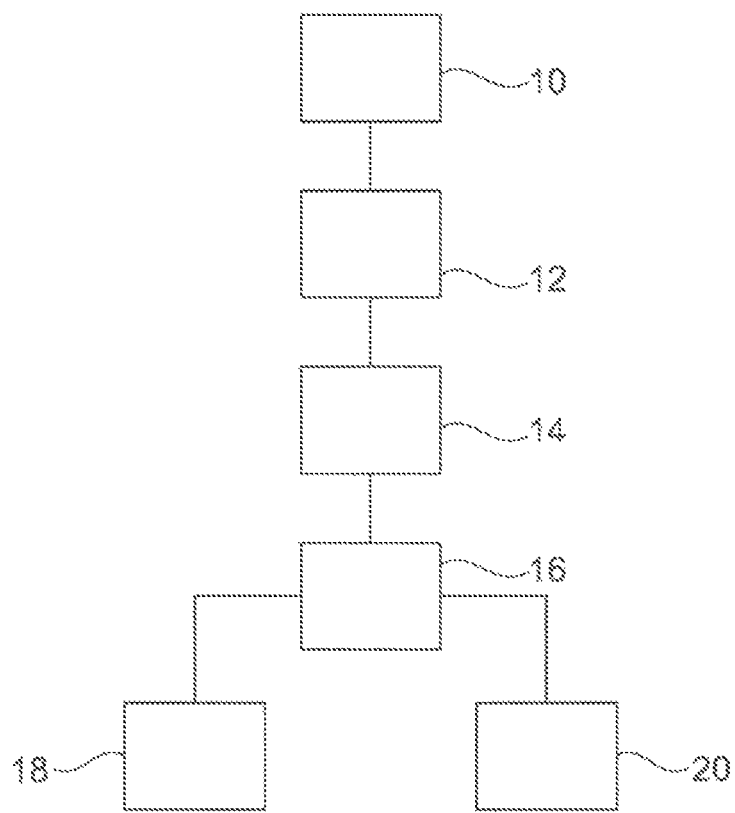
FIG. 1 shows a schematic diagram of a payload monitoring system for an aircraft.

FIG. 1 shows a schematic diagram of a payload monitoring system for an aircraft. The system comprises at least one pressure sensor 10, which is configured in the present case as a textile surface sensor. Its arrangement in the aircraft is described in more detail in FIGS. 2 and 3. The pressure sensor 10 can, for example, be connected to an on-board power supply of the aircraft or also have an autonomous power supply, such as a battery. Alternatively, the pressure sensor 10 can also be configured to operate passively and not require a power supply. The system can also comprise a plurality of pressure sensors 10, each of which is assigned, for example, to a different payload storage area of the aircraft.

The pressure sensor 10 is configured to detect a weight force and optionally its center of gravity of payload resting on a storage area to which the pressure sensor 10 is assigned. The weight force can be a force with which the payload presses on the storage area due to gravity. On the basis of the size and distribution of the payload, a weight force distribution ensues which the pressure sensor 10 can detect. For example, the pressure sensor 10 can be configured to measure a force at a plurality of locations on the storage area. These forces can be aggregated to determine a total force acting onto the storage area. At the same time, these forces are evaluated to determine at which location the aggregated total force acts in order to be able to determine respective lever arms of the weight force of the payload on the storage area.

Respective sensor signals from the pressure sensor 10 can be converted by an A/D converter 12 of the system. The sensor signals can then be transmitted by a data transmission module 14 to an evaluation device 16 and/or a receiver external to the aircraft. For example, the data transmission can be wired or wireless, for example by means of radio. Data transmission can be provided by means of WLAN and use an existing on-board WLAN, by means of Bluetooth Low Energy, whereby the power consumption can be very low, or also by means of RFID technology, for example. The weight force and its center of gravity detected by the pressure sensor 10 can be evaluated by means of the evaluation device 16, for example in order to determine an influence of the detected payload on the overall center of gravity of the aircraft. Thus, it is possible to check whether the detected payload corresponds to an expected payload and also to its planned arrangement in the aircraft. Thus, it is possible to improve trim of the aircraft and/or avoid unsafe flight conditions.

The respective sensor signals and the results of the evaluation by the evaluation device 16 can, for example, be transmitted to a database device 18 in order to be stored by it. This means that these data can be available for a later evaluation. Alternatively or additionally, the respective sensor signals and results of the evaluation can be transmitted to an output device 20 which, for example, displays the payload distribution in the cockpit of the aircraft. Thus, these data are available to the crew of the aircraft, which enables them to react accordingly to an unfavorable payload distribution and/or an exceedance of maximum payload.

The output device 20 or display can be the actual interface to the pilot and respective flight attendants. For example, the loading can be displayed by a "red-yellow-green" traffic light for the flight attendants. The exact areas, respective payload weights as well as the total weight and the resulting center of gravity can be provided for the pilot and/or the ramp agent. Additionally, a loading plan can be displayed to have a comparison to a desired loading. In case of correspondingly high deviations above predetermined threshold values, storage areas are displayed in yellow or red. This evaluation can also be performed by the evaluation device 16.

Figure 2:
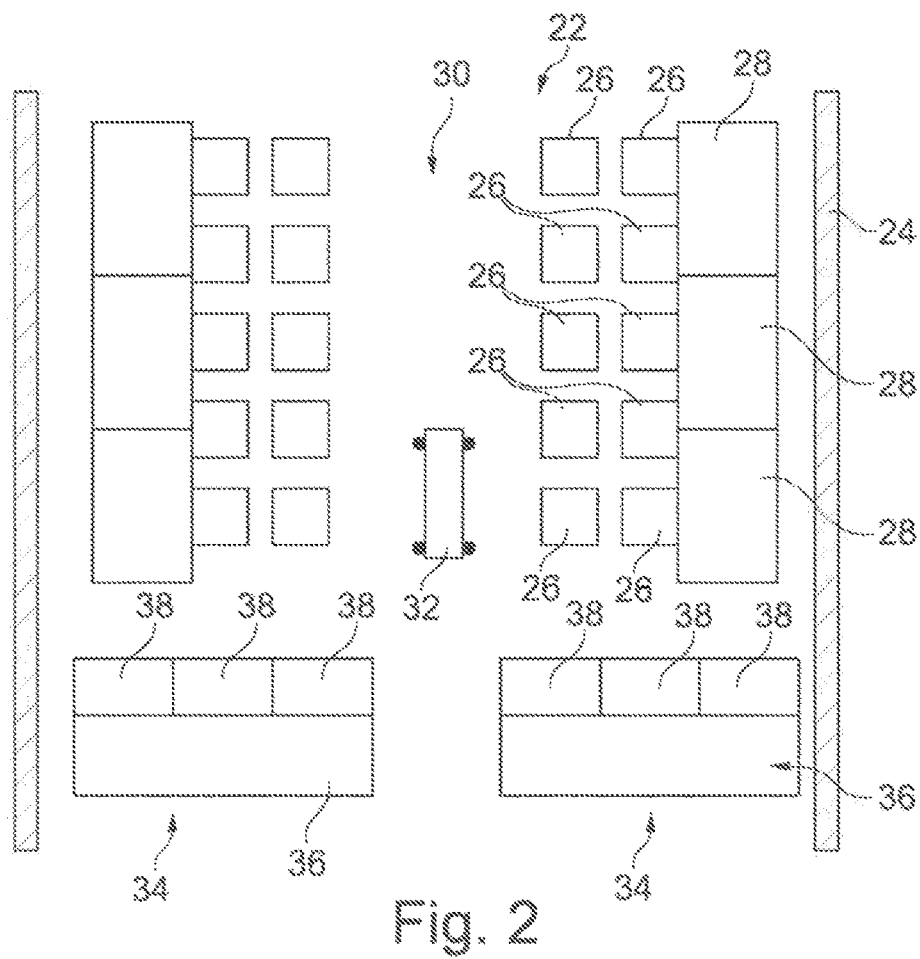
FIG. 2 shows a schematic sectional top view of part of a passenger cabin comprising the system according to FIG. 1.

FIG. 2 shows a sectional top view of part of a passenger cabin 22 of a passenger aircraft. This passenger cabin 22 is bounded by a fuselage 24. A plurality of rows of seats with respective aircraft seats 26 are arranged in the passenger cabin 22. Overhead bins 28 are arranged above respective rows of seats. An aisle 30, on which a trolley 32 is located, extends between the rows of seats. In addition, a galley 34 is arranged in the passenger cabin 22, said galley 34 comprising two work surfaces 36 and a plurality of stowage spaces 38 in which, for example, respective Atlas containers with food for the passengers can be stowed. A stowage space for the trolley 32, for example, is also provided below the work surfaces 36.

Figure 3:
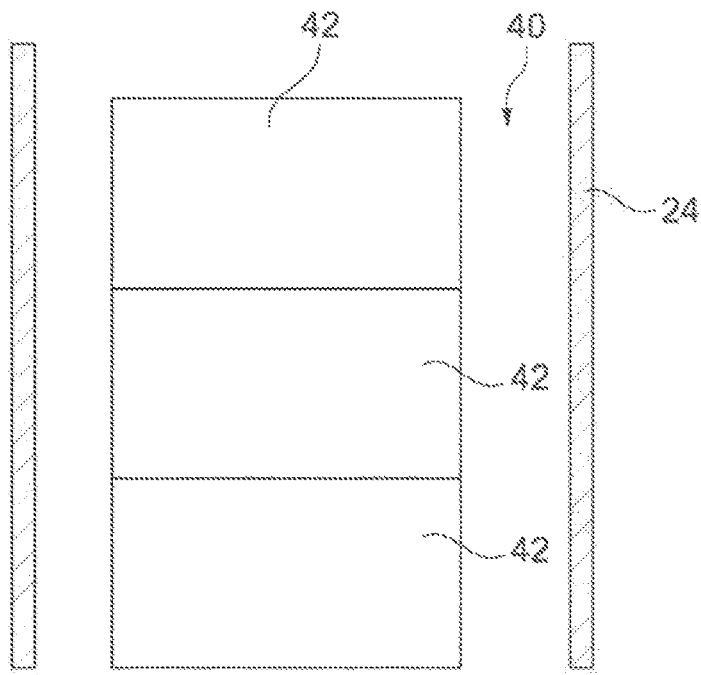
FIG. 3 shows a schematic sectional top view of part of a cargo hold of the aircraft according to FIG. 2.

FIG. 3 shows a sectional top view of part of a cargo hold 40 of the aircraft. The cargo hold 40 is also bounded by the fuselage 24. The cargo hold 40 comprises a floor area, which in the present case is divided into three floor area sectors 42, each of which is used for parking an assigned cargo container. Alternatively or additionally, the cargo hold 40 can, for example, also be configured to accommodate loose pieces of baggage or other objects.

The above-mentioned areas can be monitored by means of the payload monitoring system. Accordingly, respectively assigned pressure sensors 10 can be provided, which respectively detect a weight force and its center of gravity of payload resting on the aforementioned storage areas. Thus, for example, the weight force and its site of action of respective passengers on the seats 26 and the aisle 30 can be detected. Likewise, each storage area of the overhead bins 28 can comprise a textile surface sensor as a pressure sensor 10. Thus, the weight and location of respective pieces of baggage in the overhead bins 28 can be detected. It can also be determined whether a piece of carry-on baggage exceeds an admissible maximum weight and the crew can be accordingly advised thereof. In this way, hazard caused by falling carry-on baggage can be minimized.

The payload can also be monitored in the galley 34. For example, a pressure sensor 10 can be provided on each of the work surfaces 36 for this purpose. Thus, it can, for example, also be detected whether loose objects are still stored there and the crew can be advised thereof in the event of turbulence and/or prior to landing and takeoff. Thus, this payload can be secured. Likewise, the payload in the stowage spaces 38 can be detected by corresponding pressure sensors 10. It can thereby be automatically checked whether the food supplies have been loaded. After completion of the flight, consumption can also be detected and automatic reordering can be performed accordingly. By means of a pressure sensor 10 on the floor area for the trolley 32, similar things can also be detected when the trolley 32 is being filled. Furthermore, a warning can also be issued in this case in the event that a trolley 32 has not been properly stowed. Also at the trolley 32, which can also be part of the payload monitoring system, respective pressure sensors 10 can be provided. In particular in the case of a correspondingly high resolution of the pressure distribution, it can thus be detected, for example, which respective consumables have been consumed at the trolley 32 and to what extent. It can thus be detected, for example, that a soda pop has been consumed and must be refilled, while water is still sufficiently available.

In addition, by detecting the weight forces and their centers of gravity of the respective payloads, the system 10 can determine an influence on the overall center of gravity of the aircraft. On the one hand, this determination can be taken into account by respectively trimming the aircraft or it can be used to reposition a payload as desired prior to takeoff or after a shift. It also allows monitoring correct loading. For example, incorrect loading of heavy cargo in the cargo hold 40 can otherwise cause a tailstrike of the aircraft during takeoff. Thus, with the payload monitoring system, improper loading can be detected even before the flight begins. However, unintentional shift of payload, for example due to turbulence, can also be detected during the flight. If necessary, the payload can be secured and/or moved to the correct location. Moreover, an unintentional shift can be indicated to the pilot, which can assist the pilot in troubleshooting in the event of unusual flight characteristics of the aircraft. For example, the pilot can thus better identify whether a payload has shifted or whether one of the control surfaces of the aircraft is damaged.

The center of gravity resulting from the payload distribution in the aircraft is important for flight properties and safety. For example, an unfavorable weight distribution of the payload can require the aircraft to be strongly trimmed, which can increase its fuel consumption during the flight. By means of an extensive detection of as many storage areas as possible using respective pressure sensors 10, this influence can be very accurately detected. Alternatively, however, only the most important storage areas with the heaviest expected loads can be monitored by means of respective pressure sensors 10. For example, only the cargo hold 40 can be monitored accordingly. Thus, the system can be particularly lightweight and cost-efficient.

Safe travel by aircraft is the most important requirement in aviation. Due to the ever increasing productivity requirement and thus ever decreasing ground time for aircraft, it must be possible to load safely and reliably. Therefore, prior to each flight, it is usually exactly determined in which sections which cargo is to be loaded. However, whether this is done correctly, usually cannot be checked by the ground crew at all or not quickly enough. The pilots calculate the balance of the airplane on the basis of the previously defined load in the loading zones. The trim is adjusted accordingly and the observance of limits is checked. However, the crew and/or the pilot must rely on the fact that the aircraft was in fact loaded as planned. Instead, by means of the system described herein, actual control can take place and safety and efficiency in air traffic can be increased.

During takeoff or even in the event of strong turbulence, the forces can cause the load to shift. This can also be detected by the system described herein in order to enable correspondingly targeted countermeasures.

The intelligent monitoring system of the load control described herein is capable of determining the center of gravity of the respective monitored space or payload storage area in the surface coordinates of the aircraft and forwarding them to the cockpit and/or a tablet, for example.

Likewise, the intelligent load monitoring system can monitor the contents of boxes in the galley, containers, trolleys and/or kitchen bins and reduce maintenance times, since a catering crew can be notified of the consumed goods in advance via remote transmission and/or tablet. Thus, the loading of consumables can be optimized and respective catering costs can be reduced.

The system can also be used for so-called pantry code monitoring. Each catering loading or composition of consumables has a pantry code. This code allows, for example, conclusions to be drawn about the weight and type of the respective loading. For example, it is not necessary to weigh the catering load. Instead, for example, a loading can be defined once for a specific flight and the airplane can always be loaded with this catering loading. A nominal weight of this loading is known, for example 1.5 tons. Whether each catering loading has been correctly loaded and/or provided can then be finally checked by the system in the airplane. The system can comprise an additional sensor to detect the pantry code of respective payloads, for example by means of a barcode reader. Thus, controlling and monitoring is also possible in this respect. Additionally, it can thus also be taken into account that, for example, the catering loading is correctly composed but has been placed in the wrong location in the aircraft. The evaluation device 16 can also be configured for such a check.

Likewise, the system can give notice of changes in the respective center of gravity of the monitored space to the cockpit during the flight. With this information, the pilots can intervene in the trim of the aircraft in a targeted way if necessary and avert imminent damage. Due to the high demand for safe travel by airlines as well as the high acquisition costs of aircraft, there is a desire to minimize the ground time (idle time, turn-around time, etc.) of the aircraft. Hence, the system has advantages for airlines and insurance companies.

The system is a load control and information system that can show and record weight distribution in real time. The payload in individual sectors of the aircraft is weighed. This provides information on the respective pressure per area as well as the resulting center of gravity on the area of the respective measured storage area. The data are sent to the cockpit and/or stored in order to make them available to the airline for evaluation as well as to have them available for further processing and retrieval. For example, these data can also be made available to respective airport operators, in particular sold, in order to improve the work of respective ground crews, such as a loading crew.

The respective load status of the baggage rooms can be communicated to the pilot by means of a signal. If necessary, the pilot can initiate measures at an early stage, such as a redistribution of payload prior to takeoff. After being transmitted, the findings obtained can be displayed in detail on a computer, tablet, smartphone or smartwatch in order to perform a more precise evaluation. Moreover, they can also be transmitted remotely.

Respective pressure sensors 10 can serve as a surface or covering of a storage area, which can minimize cost and space requirements. For example, a carpet of the aisle 30 can be formed by a textile surface sensor, whereby the pressure sensor 10 is integrated into the floor covering. By means of the obtained sensor data, information can be obtained as to whether the baggage is stowed as intended or whether there is and/or has been a shift of the load.

By means of the system, it can also be detected how many drinks and/or dishes of which type are available after completion of the service, in order to automatically request the quantity to be refilled from the caterer.

By means of the payload monitoring system, the following can be achieved and/or automated:
  determination of the center of gravity of the baggage room area in order to optimize fuel consumption;
  avoidance of a tailstrike;
  identification of shifted baggage and notification to the pilot, in particular immediate notification;
  accurate determination of storage capacities, as well as automated reordering;
  analysis of the consumption behavior of the passengers;
  material fatigue as a function of load over lifetime;
  optimization of the trim.

For example, the pressure sensor 10 generates an unambiguous signal (e.g., in the form of an electrical resistance) that allows conclusions to be drawn about the load position as well as the weight and resultant center of gravity. Information can be derived therefrom as to how the baggage was stowed and whether it maintained its location throughout the entire flight. A corresponding evaluation can be performed by the evaluation device 16. Likewise, information can be derived as to whether the trolleys and/or stowage spaces in the galley are properly and/or sufficiently stocked.

LIST OF REFERENCE SIGNS

10 Pressure sensor
12 A/D converter
14 Transmission device
16 Evaluation device
18 Database device
20 Output device
22 Passenger cabin
24 Fuselage
26 Aircraft seat
28 Overhead bin
30 Aisle
32 Trolley
34 Galley
36 Work surface
38 Stowage space
40 Cargo hold
42 Floor areas

The invention claimed is:

1. A payload monitoring system of an aircraft, comprising:
  at least one storage area for a payload, wherein the at least one storage area comprises at least one floor area in a cargo hold of the aircraft, and
  at least one pressure sensor,
  wherein each at least one pressure sensor is configured to detect a weight force and/or a center of gravity of the payload resting on the storage area during time periods including during and immediately after loading of the cargo hold, prior to takeoff of the aircraft, during a flight of the aircraft including upon the aircraft reaching a cruising altitude, and prior to the aircraft landing, and
  wherein the system is adapted to determine from the detected weight forces and/or centers of gravity an actual payload distribution in the cargo hold during the time periods.

2. The system according to claim 1, wherein the at least one floor area in the cargo hold comprises a plurality of floor area sectors, and wherein the system comprises a plurality of pressure sensors respectively assigned to the plurality of floor area sectors for respectively detecting the weight force and/or the center of gravity of payloads resting on the plurality of floor area sectors, wherein one or more pressure sensors are assigned to one floor area sector.

3. The system according to claim 2, wherein each of the floor area sectors is adapted to accommodate at least one cargo container.

4. The system according to claim 1, wherein the storage area comprises at least 20 m$^2$.

5. The system according to claim 1, further comprising an evaluation device which is configured to determine an influence of the detected payload on the overall center of gravity of the aircraft on the basis of the detected weight forces and/or centers of gravity.

6. The system according to claim 5, wherein, depending on the determined influence of the detected payload on the overall center of gravity of the aircraft, the evaluation device is further configured to determine a trim of the aircraft corresponding thereto, wherein the system comprises a control device that adjusts the determined trim.

7. The system according to claim 5, wherein the evaluation device is configured to compare the determined influence of the detected payload on the overall center of gravity of the aircraft with a predetermined influence of the payload on the overall center of gravity of the aircraft and to output a warning signal when a maximum influence is exceeded.

8. The system according to claim 1, further comprising an evaluation device which is configured to compare the detected weight forces and/or centers of gravity with respective predetermined weight forces and/or centers of gravity and to output a warning signal when a maximum deviation is exceeded.

9. The system according to claim 1, further comprising an evaluation device which is configured to detect actual weight forces and/or their respective actual centers of gravity on the basis of the detected weight forces and/or centers of gravity as a function of an aircraft attitude.

10. The system according to claim 1, wherein at least one pressure sensor is arranged in or on a side surface laterally bounding a respective storage area, wherein the at least one laterally arranged sensor is configured to detect the weight force and/or the center of gravity of the payload supported on the side surface.

11. The system according to claim 1, wherein at least one of the pressure sensors is configured as a textile surface sensor.

12. An aircraft comprising the payload monitoring system according to claim 1.

13. A method for operating an aircraft comprising the payload monitoring system according to claim 1, wherein the at least one weight force and/or center of gravity of the payload arranged on the at least one floor area in the cargo hold is detected during the time periods, and the actual payload distribution in the cargo hold is determined on the basis thereof during the time periods.

14. The method according to claim 13, wherein the at least one floor area in the cargo hold comprises a plurality of floor area sectors and wherein at least one weight force and/or center of gravity is detected for each of said floor area sectors.

15. The method according to claim 14, wherein a cargo container is parked on the plurality of the floor area sectors.

* * * * *